US010355803B2

United States Patent
Manolakos et al.

(10) Patent No.: US 10,355,803 B2
(45) Date of Patent: Jul. 16, 2019

(54) MULTIPLEXING REFERENCE SIGNALS WITH SCALABLE NUMEROLOGY FOR NEW RADIO (NR) NETWORKS

(71) Applicant: QUALCOMM Incorporated, San Diego, CA (US)

(72) Inventors: Alexandros Manolakos, San Diego, CA (US); Yang Yang, San Diego, CA (US); June Namgoong, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,319

(22) Filed: Oct. 23, 2017

(65) Prior Publication Data

US 2018/0115382 A1 Apr. 26, 2018

Related U.S. Application Data

(60) Provisional application No. 62/412,123, filed on Oct. 24, 2016.

(51) Int. Cl.
*H04B 7/06* (2006.01)
*H04L 5/00* (2006.01)
(Continued)

(52) U.S. Cl.
CPC .......... *H04J 11/0073* (2013.01); *H04B 7/066* (2013.01); *H04J 11/0023* (2013.01);
(Continued)

(58) Field of Classification Search
CPC .......... H04L 5/0048; H04L 5/0007; H04L 27/2601; H04L 27/2602; H04L 27/2613; H04L 7/2601; H04L 7/2602; H04L 7/2613
See application file for complete search history.

(56) References Cited

U.S. PATENT DOCUMENTS

2014/0241242 A1 8/2014 Josiam et al.
2016/0344519 A1 11/2016 Lin et al.
(Continued)

OTHER PUBLICATIONS

Intel Corporation: "Multiplexing of Different Numerologies for Forward Compatibility", 3GPP Draft; R1-167124, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 13, 2016, XP051133001, Retrieved from the Internet: URL:http://www.3gpp.org/ftp/tsg_ran/WG1_RL1/TSGR1_86/Docs/ [retrieved on Aug. 13, 2016], 3 pages.
(Continued)

*Primary Examiner* — Shuwang Liu
*Assistant Examiner* — Gina M McKie
(74) *Attorney, Agent, or Firm* — Loza & Loza, LLP

(57) ABSTRACT

Wireless communication devices are adapted to facilitate multiplexing of reference signals. According to one example, a wireless communication device can multiplex a first reference signal and a second reference signal utilizing code division multiplexing for transmission across a first resource element and a second resource element. The first resource element may utilize a first subcarrier in a first OFDM symbol employing a first numerology. The second resource element may utilize a second subcarrier in a second OFDM symbol employing a second numerology that is different from the first numerology, where the second subcarrier overlaps in frequency at least a portion of the first subcarrier. The first and second OFDM including the multiplexed first and second reference signals may subsequently be transmitted. Other aspects, embodiments, and features are also included.

30 Claims, 15 Drawing Sheets

(51) Int. Cl.
*H04J 11/00* (2006.01)
*H04J 13/00* (2011.01)
*H04L 27/26* (2006.01)
*H04W 56/00* (2009.01)

(52) U.S. Cl.
CPC ............ *H04J 13/00* (2013.01); *H04J 13/004* (2013.01); *H04L 5/0019* (2013.01); *H04L 5/0051* (2013.01); *H04L 27/2613* (2013.01); *H04W 56/0015* (2013.01)

(56) References Cited

U.S. PATENT DOCUMENTS

| | | | |
|---|---|---|---|
| 2016/0352551 | A1 | 12/2016 | Zhang et al. |
| 2017/0111930 | A1 | 4/2017 | Rajagopal et al. |
| 2017/0118055 | A1 | 4/2017 | Guey et al. |
| 2017/0163463 | A1 | 6/2017 | Werner et al. |
| 2017/0331577 | A1* | 11/2017 | Parkvall ............... H04J 11/0079 |
| 2018/0097678 | A1* | 4/2018 | Zhou ..................... H04L 1/0013 |
| 2018/0098312 | A1* | 4/2018 | Lin ....................... H04L 1/1861 |

OTHER PUBLICATIONS

Intel Corporation: "Remaining Details of D2D Physical Structure Design", 3GPP Draft; R1-141160, 3rd Generation Partnership Project (3GPP), Mobile Competence Centre; 650, Route Des Lucioles; F-06921 Sophia-Anti Polls Cedex; France, vol. RAN WG1, No. Shenzhen, China; Mar. 30, 2014, XP050786835, Retrieved from the Internet: URL:http://www.3gpp.org/ftp/Meetings_3GPP_Sync/RAN1/Docs/ [retrieved on Mar. 30, 2014], 10 pages.

International Search Report and Written Opinion—PCT/US2017/058149—ISA/EPO—Jan. 17, 2018.

Nokia et al., "On the DMRS structure for NR", 3GPP Draft; R1-1610271, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Sep. 30, 2016, XP051158910, Retrieved from the Internet: URL:http://www.3gpp.org/ftp/tsg_ran/WG1_RL1/TSGR1_86b/Docs/ [retrieved on Sep. 30, 2016], 8 pages.

Oppo: "Subcarrier Spacing Design for Data and Reference Signal", 3GPP Draft; R1-166609, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051140300, Retrieved from the Internet: URL:http://www.3gpp.org/ftp/Meetings_3GPP_Sync/RAN1/Docs/ [retrieved on Aug. 21, 2016], 7 pages.

* cited by examiner 802     804     806

| w11*P1+w12*P2+ w13*P3 | w21*P1+w22*P2+ w23*P3 | w31*P1+w32*P2+ w33*P3 |

$$W = DFT(3) = \begin{bmatrix} 1.0000 + 0.0000i & 1.0000 + 0.0000i & 1.0000 + 0.0000i \\ 1.0000 + 0.0000i & -0.5000 - 0.8660i & -0.5000 + 0.8660i \\ 1.0000 + 0.0000i & -0.5000 + 0.8660i & -0.5000 - 0.8660i \end{bmatrix}$$

MULTIPLEXING REFERENCE SIGNALS WITH SCALABLE NUMEROLOGY FOR NEW RADIO (NR) NETWORKS

PRIORITY CLAIM

This application claims priority to and the benefit of provisional patent application No. 62/412,123, filed in the U.S. Patent and Trademark Office on Oct. 24, 2016, the entire content of which is incorporated herein by reference as if fully set forth below in its entirety and for all applicable purposes.

TECHNICAL FIELD

The technology discussed below relates generally to wireless communication systems, and more particularly, to methods and devices for facilitating reference signal multiplexing.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements. To improve such flexibility and scalability, it is desirable to provide improved schemes for multiplexing reference signals.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate multiplexing reference signals. One or more aspects of the disclosure include wireless communication devices configured to multiplex reference signals. According to at least one example, wireless communication devices may include a transceiver and a memory. A processor may be communicatively coupled to the transceiver and the memory, and may be adapted to multiplex a first reference signal and at least a second reference signal utilizing code division multiplexing for transmission across a first resource element and a second resource element. The first resource element may utilize a first subcarrier, and may be associated with a first orthogonal frequency division multiplexing (OFDM) symbol employing a first numerology. The second resource element may utilize a second subcarrier overlapping in frequency at least a portion of the first subcarrier, and may be associated with a second OFDM symbol employing a second numerology that is different from the first numerology. The processor may be further adapted to transmit the first OFDM symbol and the second OFDM symbol via the transceiver, the transmission including the multiplexed first reference signal and second reference signal.

Additional aspects of the present disclosure include methods operational on an electronic device and/or means for performing such methods. According to at least one example, such methods may include multiplexing a first reference signal and at least a second reference signal utilizing code division multiplexing for transmission across a first resource element and a second resource element. The first resource element may utilize a first subcarrier in a first OFDM symbol employing a first numerology, and the second resource element may utilize a second subcarrier in a second OFDM symbol employing a second numerology that is different from the first numerology, the second subcarrier overlapping in frequency at least a portion of the first subcarrier. The first OFDM symbol and the second OFDM symbol may be transmitted with the multiplexed first reference signal and second reference signal.

Yet additional aspects of the present disclosure include processor-readable storage mediums storing processor-executable programming. In at least one example, the processor-executable programming may be adapted to cause a processing circuit to multiplex a first reference signal and at least a second reference signal utilizing code division multiplexing for transmission across a first resource element and a second resource element. The first resource element may be associated with a first OFDM symbol employing a first numerology, and the second resource element may be associated with a second OFDM symbol employing a second numerology that is different from the first numerology. The processor-executable programming may further be adapted to cause a processing circuit to transmit the first OFDM symbol and the second OFDM symbol, the transmission including the multiplexed first reference signal and second reference signal.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
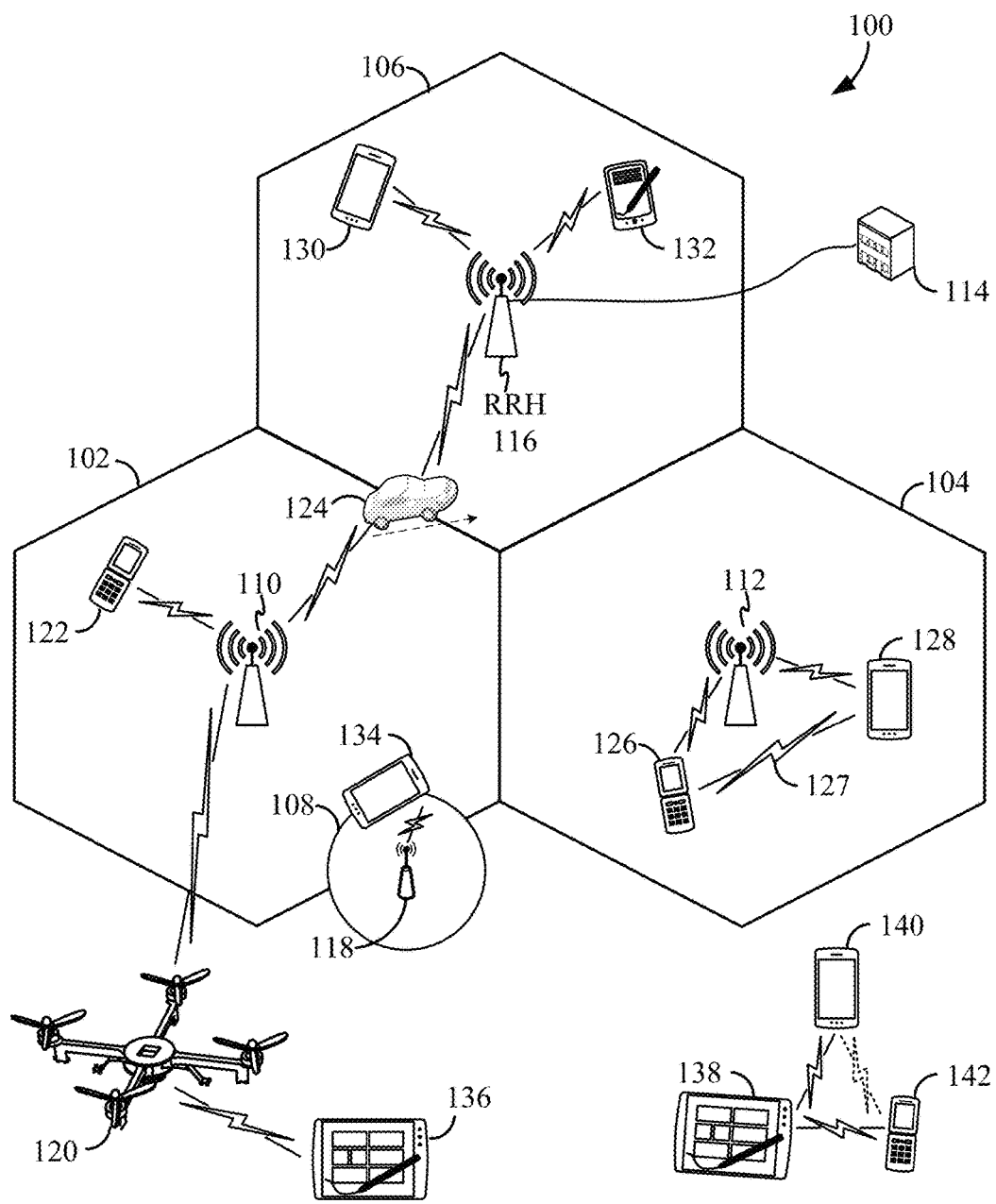
FIG. 1 is a block diagram of a network environment in which one or more aspects of the present disclosure may find application.

The various concepts presented throughout this disclosure may be implemented across a broad variety of telecommunication systems, network architectures, and communication standards. Referring now to FIG. 1, as an illustrative example without limitation, a block diagram of a network environment in which one or more aspects of the present disclosure may find application is provided. The access network 100 is adapted to facilitate wireless communication between two or more wireless communication devices.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, each cell is served by a respective base station (BS). Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two base stations 110 and 112 are shown in cells 102 and 104, and a third base station 114 is shown controlling a remote radio head (RRH) 116 in cell 106. In this example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110, UEs 126 and 128 may be in communication with base station 112, UEs 130 and 132 may be in communication with base station 114 by way of RRH 116, UE 134 may be in communication with base station 118, and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
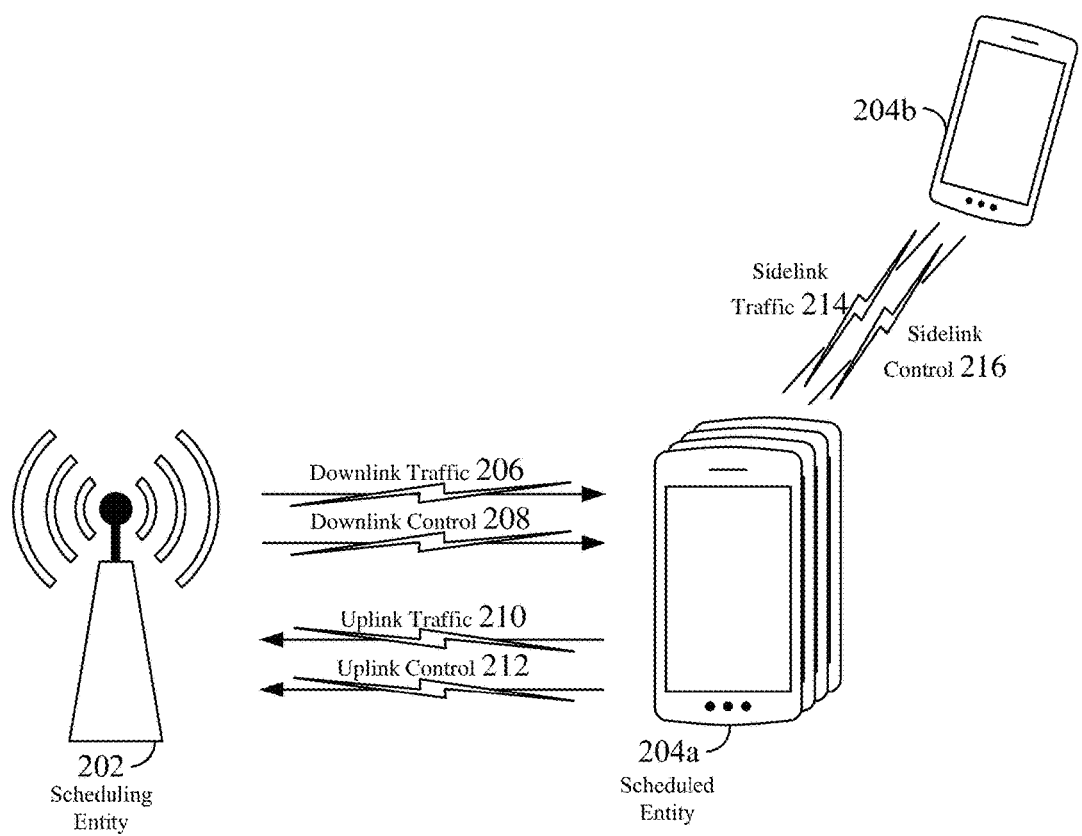
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

Within the present disclosure, a frame refers to a duration of 10 ms for wireless transmissions, with each frame consisting of 10 subframes of 1 ms each. On a given carrier, there may be one set of frames in the UL, and another set of frames in the DL.

The air interface in the radio access network 100 may utilize one or more multiplexing and multiple access algorithms to enable simultaneous communication of the various devices. Various aspects of the present disclosure will be described with reference to an orthogonal frequency division multiplexing (OFDM) waveform, schematically illustrated in FIG. 3. It should be understood by those of ordinary skill in the art that the various aspects of the present disclosure may be applied to a discrete Fourier transform spread OFDM (DFT-s-OFDM) waveform in substantially the same way as described herein below. That is, while some examples of the present disclosure may focus on an OFDM link for clarity, it should be understood that the same principles may be applied as well to DFT-s-OFDM waveforms.

Figure 3:
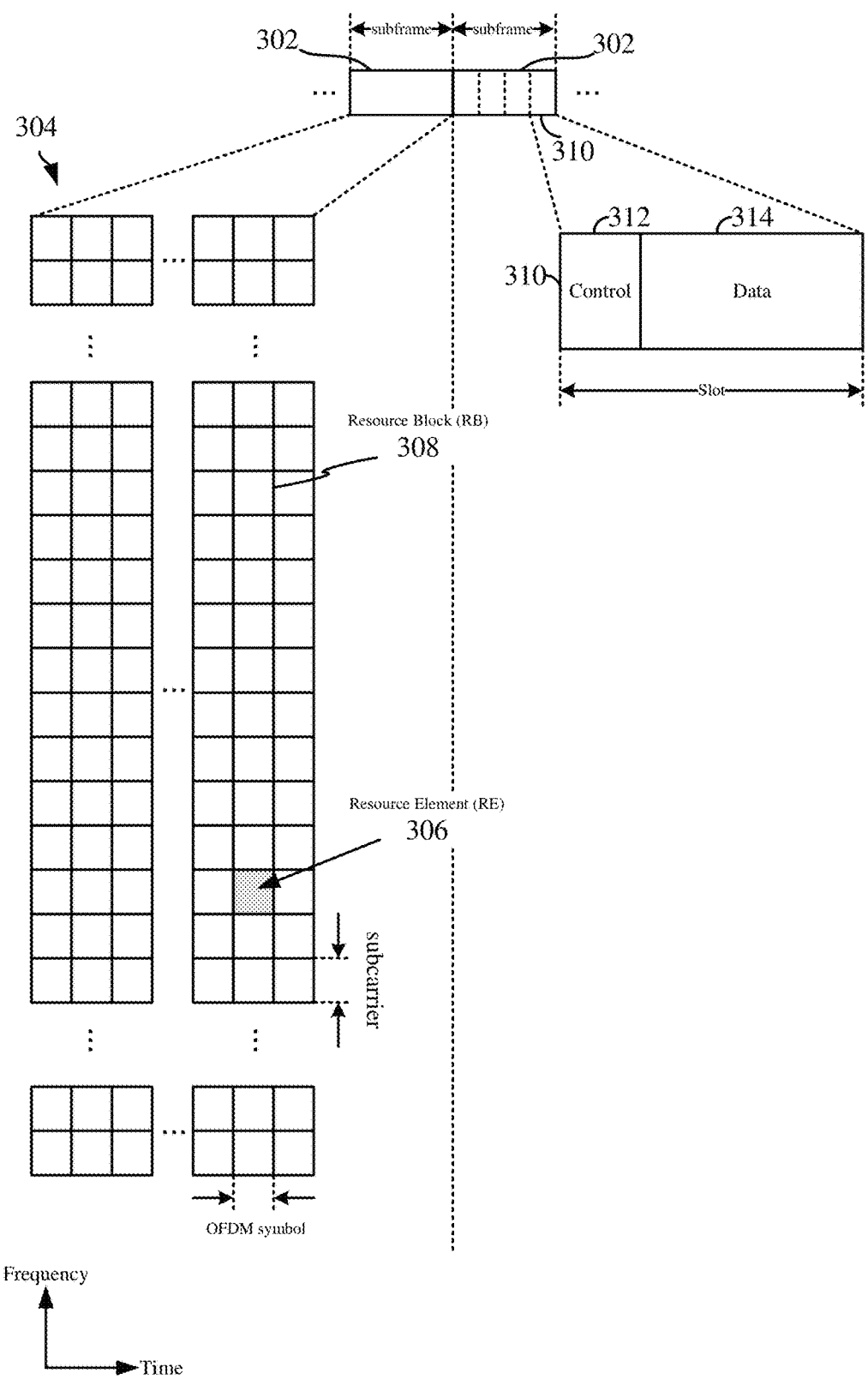
FIG. 3 is a block diagram illustrating a time-frequency grid split into resource elements (REs).

Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols, and frequency is in the vertical direction with units of subcarriers.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. A resource element, which is 1 subcarrier×1 symbol, is the smallest discrete part of the time-frequency grid, and contains a single complex value representing data from a physical channel or signal. Depending on the modulation utilized in a particular implementation, each resource element may represent one or more bits of information. In some examples, a block of resource elements may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various resource elements 306 within a RB 308 may be scheduled to carry one or more physical channels, including control channels, shared channels, data channels, etc. Other resource elements 306 within the RB 308 may also carry pilots or reference signals, including but not limited to a demodulation reference signal (DMRS) a control reference signal (CRS), or a sounding reference signal (SRS). These pilots or reference signals may provide for a receiving device to estimate channel quality, to perform channel estimation of the corresponding channel, which may enable coherent demodulation/detection of the control and/or data channels within the RB 308, or in any other suitable fashion serve as a reference for a receiving device.

In a DL transmission, the transmitting device (e.g., the scheduling entity 202) may allocate one or more resource elements 306 (e.g., within a control region 312) to carry DL control information 208 including one or more DL control channels, such as a PBCH, a PSS, a SSS, a physical control format indicator channel (PCFICH), a physical hybrid automatic repeat request (HARQ) indicator channel (PHICH), and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of resource elements for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 204) may utilize one or more resource elements 306 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, one or more resource elements 306 (e.g., within the data region 314) may be allocated for user data or traffic data. Such traffic may be carried on one or more traffic channels, such as, for a DL transmission, a physical downlink shared channel (PDSCH), or for an UL transmission, a physical uplink shared channel (PUSCH). In some examples, one or more resource elements 306 within the data region 314 may be configured to carry system information blocks (SIB s), carrying information that may enable access to a given cell.

The channels or carriers described above and illustrated in FIGS. 2 and 3 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

When utilizing an OFDM waveform, as described above, the subcarrier spacing or spacing between tones is generally related to the symbol rate. With a suitable setting for the symbol rate (e.g., setting the symbol period equal to the inverse of the subcarrier spacing), transmissions on very closely spaced subcarriers may be orthogonal to one another. In this way, OFDM channels provide for high data rates by allocating a data stream in a parallel manner across multiple closely spaced subcarriers. In next generation communication networks, different transmission numerologies may be supported. That is, resource elements can be employed with scalable numerology. Numerology refers to a combination of subcarrier spacing and cyclic prefix (CP) overhead. However, to maintain orthogonality of the subcarriers or tones, the relationship between the subcarrier spacing and the symbol rate should be maintained. Thus, supported numerologies with different subcarrier spacing will have different accompanying symbol rates.

The resource elements that have different transmission numerologies can be frequency division multiplexed or time division multiplexed. Because of the support for different transmission numerologies, a first portion of the allocated bandwidth can be transmitted using a first numerology and a second portion can be transmitted using a second, different, numerology. In some instances, some OFDM symbols can use one or another numerology.

Figure 4:
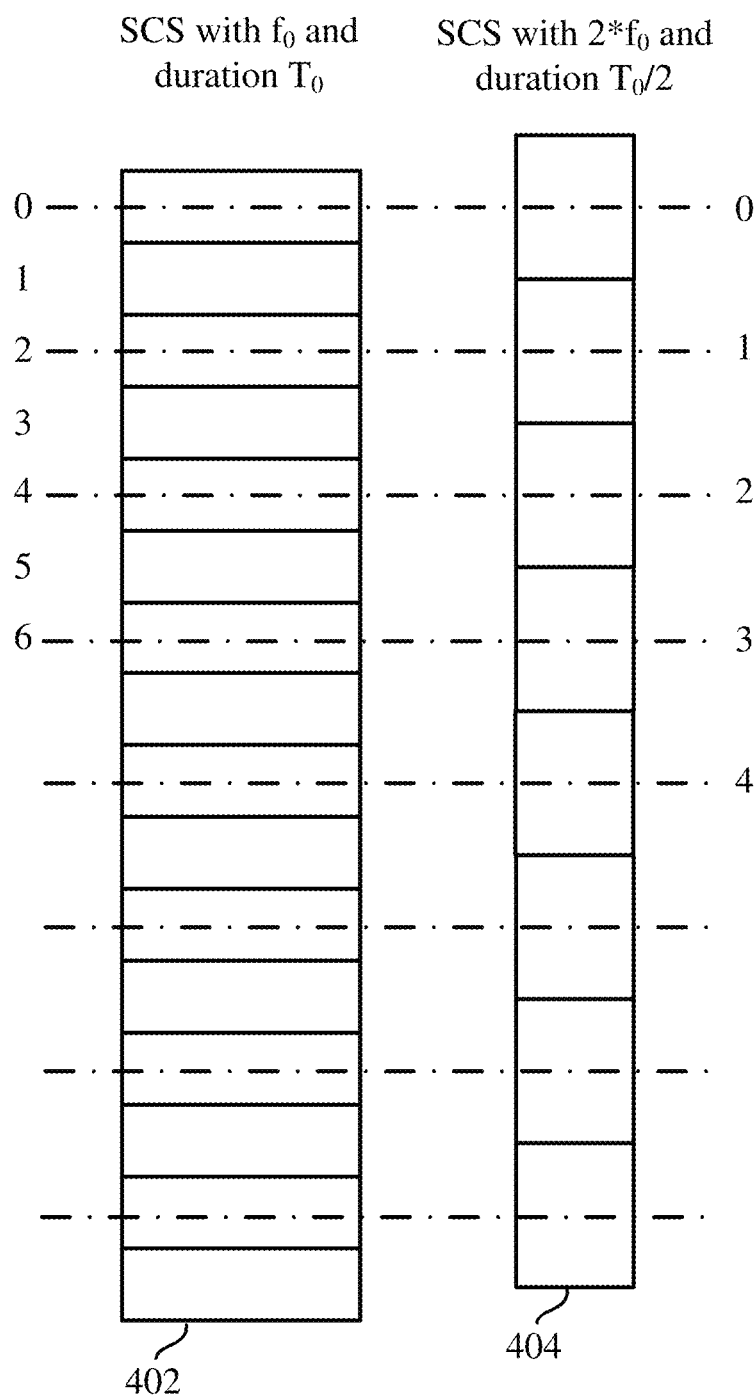
FIG. 4 is a block diagram illustrating at least one example of two orthogonal frequency division multiplexing (OFDM) symbols associated with a scaled numerology family.

According to aspects of the present disclosure, wireless communication devices, such as a scheduling entity and/or a scheduled entity, can employ a scaled numerology family for multiplexing across these resource elements. A scaled numerology family may refer to instances where a base subcarrier spacing is employed, and the base subcarrier spacing is scaled by some integer while keeping the same cyclic prefix overhead. The symbol duration is also scaled by the inverse of the same integer used to scale the subcarrier spacing. For example, FIG. 4 shows a block diagram illustrating at least one example of two OFDM symbols associated with a scaled numerology family. As depicted, a first (or "base") OFDM symbol 402 may employ a subcarrier spacing of $f_0$ with a duration of $T_0$. A second (or "scaled") OFDM symbol 404 may employ a subcarrier spacing $2*f_0$ with a duration of $\frac{1}{2}*T_0$. In some examples, the first symbol 402 and the second symbol 404 may be located within the same subframe or slot. In other examples, the first symbol 402 and the second symbol 404 may be located within different subframes or slots. In the example shown in FIG. 4, the center of the resource elements 0, 1, 2, 3, 4, etc. for the second OFDM symbol 404 align with the respective center of resource elements 0, 2, 4, 6, etc. of the first OFDM symbol 402, as shown by the broken lines extending between the two OFDM symbols.

It will be understood that the scaled integer of "2" is just an example, and other scaling integers can be used. For example, a second OFDM symbol may employ a subcarrier spacing of $3*f_0$ with a duration of $\frac{1}{3}*T_0$. A more general example can be expressed as the scaled OFDM symbol being $k*f_0$ with a duration of $1/k*T_0$. Further examples described in this disclosure will use the example shown in FIG. 4, where the integer 'k' is equal to 2.

As shown in FIG. 4, the first OFDM symbol 402 employs a smaller subcarrier spacing than the subcarrier spacing for the second OFDM symbol 404. Further, symbols are configured so that the center of some of the resource elements of the first OFDM symbol 402 are aligned with the center of the resource elements of the second OFDM symbol 404. Because some of the resource elements across the two symbols are centered, those centered resource elements for the two symbols can be transmitted through a similar frequency band or channel. For instance, resource elements 0, 2, 4, 6, etc. of the first OFDM symbol 402 will experience at least substantially the same channel as resource elements 0, 1, 2, 3, etc. of the second OFDM symbol 404. In other words, the frequency band utilized for resource elements 0, 2, 4, 6, etc. of the first OFDM symbol 402 can overlap at least a portion of the frequency band utilized for resource elements 0, 1, 2, 3, etc. of the second OFDM symbol 404.

According to aspects of the present disclosure, wireless communication devices, such as a scheduling entity and/or a scheduled entity, may employ OFDM symbols with different numerologies for multiplexing in a manner that efficiently uses available resources.

Figure 5:
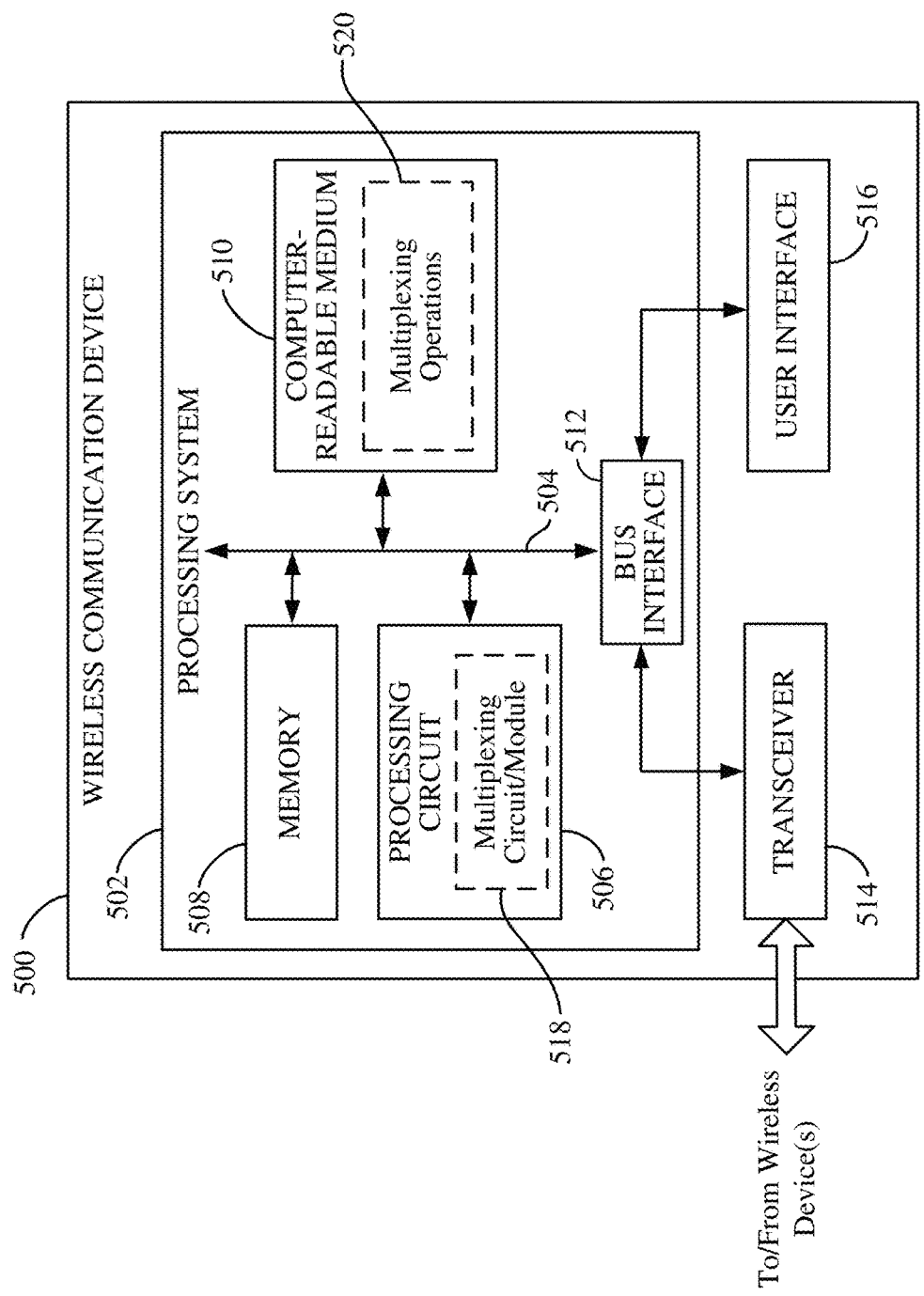
FIG. 5 is a block diagram illustrating select components of a wireless communication device according to at least one example of the present disclosure.

Turning to FIG. 5, a block diagram is shown illustrating select components of wireless communication device 500 according to at least one example of the present disclosure. In this example, the processing system 502 is implemented with a bus architecture, represented generally by the bus 504. The bus 504 may include any number of interconnecting buses and bridges depending on the specific application of the processing system 502 and the overall design constraints. The bus 504 communicatively couples together various circuits including one or more processors (represented generally by the processing circuit 506), a memory 508, and computer-readable media (represented generally by the storage medium 510). The bus 504 may also link various other circuits such as timing sources, peripherals, voltage regulators, and power management circuits, which are well known in the art, and therefore, will not be described any further. A bus interface 512 provides an interface between the bus 504 and a transceiver 514. The transceiver 514 provides a means for communicating with various other apparatus over a transmission medium. Depending upon the nature of the apparatus, a user interface 516 (e.g., keypad, display, speaker, microphone, joystick) may also be provided.

The processing circuit 506 is responsible for managing the bus 504 and general processing, including the execution of programming stored on the computer-readable storage medium 510. The programming, when executed by the processing circuit 506, causes the processing system 502 to perform the various functions described below for any particular apparatus. The computer-readable storage medium 510 and the memory 508 may also be used for storing data that is manipulated by the processing circuit 506 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 506 is arranged to obtain, process and/or send data, control data access and storage, issue commands, and control other desired operations. The processing circuit 506 may include circuitry adapted to implement desired programming provided by appropriate media, and/or circuitry adapted to perform one or more functions described in this disclosure. For example, the processing circuit 506 may be implemented as one or more processors, one or more controllers, and/or other structure configured to execute executable programming and/or execute specific functions. Examples of the processing circuit 506 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 506 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 506 are for illustration and other suitable configurations within the scope of the present disclosure are also contemplated.

In some instances, the processing circuit 506 may include a multiplexing circuit and/or module 518. The multiplexing circuit/module 518 may generally include circuitry and/or programming (e.g., programming stored on the storage medium 510) adapted to multiplex reference signals across OFDM symbols with different numerology. For example, the multiplexing circuit/module 518 may be configured to implement one or more of the multiplexing functions described herein. As used herein, reference to circuitry and/or programming may be generally referred to as logic (e.g., logic gates and/or data structure logic).

The storage medium 510 may represent one or more computer-readable devices for storing programming, such as processor executable code or instructions (e.g., software, firmware), electronic data, databases, or other digital information. The storage medium 510 may also be used for storing data that is manipulated by the processing circuit 506 when executing programming. The storage medium 510 may be any available non-transitory media that can be accessed by a general purpose or special purpose processor, including portable or fixed storage devices, optical storage devices, and various other mediums capable of storing, containing and/or carrying programming. By way of example and not limitation, the storage medium 510 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 510 may be coupled to the processing circuit 506 such that the processing circuit 506 can read information from, and write information to, the storage medium 510. That is, the storage medium 510 can be coupled to the processing circuit 506 so that the storage medium 510 is at least accessible by the processing circuit 506, including examples where the storage medium 510 is integral to the processing circuit 506 and/or examples where the storage medium 510 is separate from the processing circuit 506 (e.g., resident in the processing system 502, external to the processing system 502, distributed across multiple entities).

Programming stored by the storage medium 510, when executed by the processing circuit 506, can cause the processing circuit 506 to perform one or more of the various functions and/or process steps described herein. In at least some examples, the storage medium 510 may include multiplexing operations 520. The multiplexing operation 520 are generally adapted to cause the processing circuit 506 to multiplex reference signals across OFDM symbols with different numerology, as described herein.

Thus, according to one or more aspects of the present disclosure, the processing circuit 506 is adapted to perform (independently or in conjunction with the storage medium 510) any or all of the processes, functions, steps and/or routines for any or all of the wireless communication devices described herein (e.g., base station 110, 112, 114, 118, UE 138, quadcopter 120, UE 122, 124, 126, 128, 130, 132, 134, 136, 138, 140, 142, scheduling entity 202, scheduled entity 204). As used herein, the term "adapted" in relation to the processing circuit 506 may refer to the processing circuit 506 being one or more of configured, employed, implemented, and/or programmed (in conjunction with the storage medium 510) to perform a particular process, function, step and/or routine according to various features described herein.

In operation, the wireless communication device 500 is configured to multiplex multiple reference signals across two or more OFDM symbols that utilize different numerologies. In general, the wireless communication device 500 may utilize code division multiplexing to multiplex the multiple reference signals across the multiple OFDM symbols.

Figure 6:
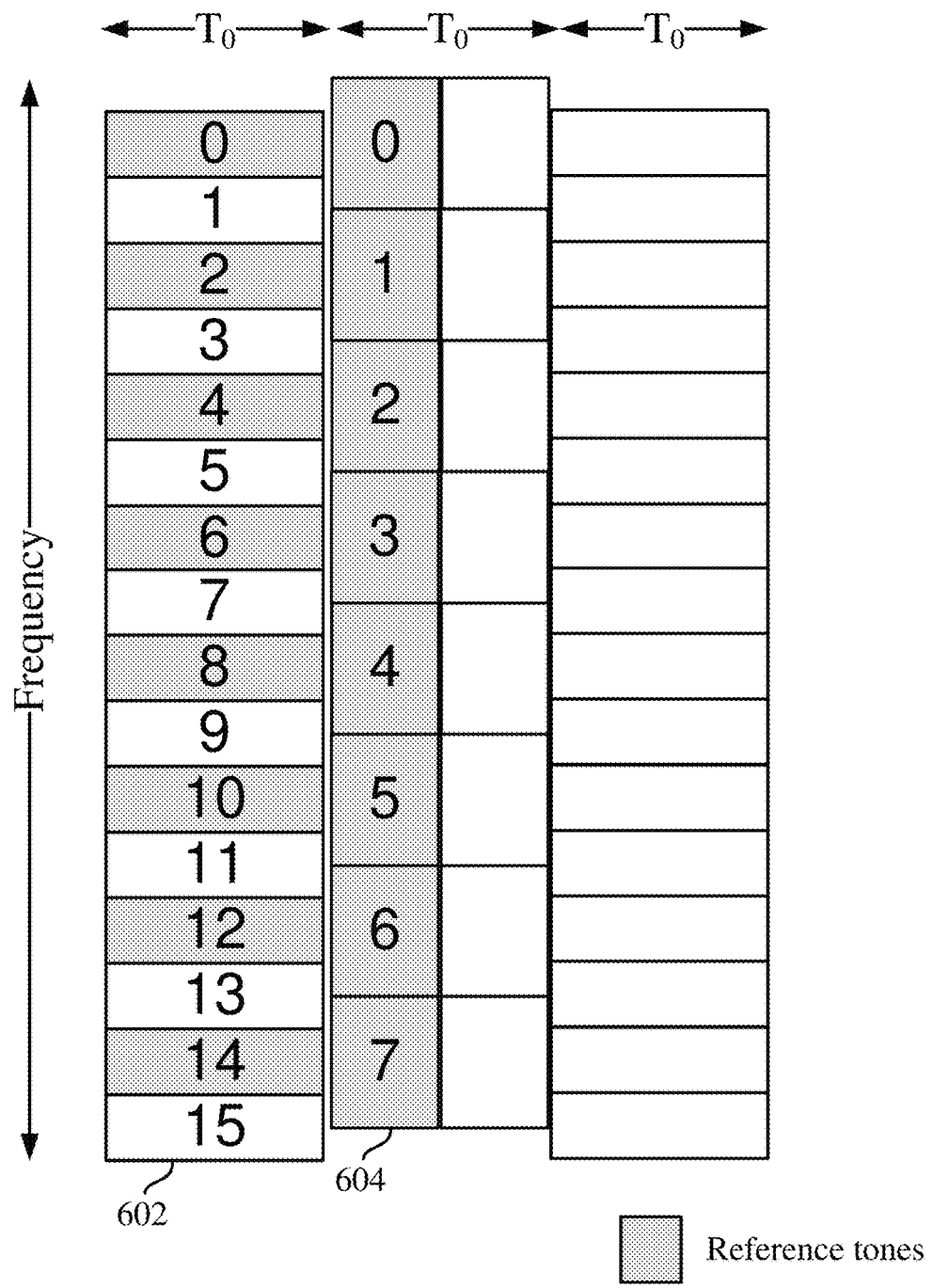
FIG. 6 is a block diagram illustrating multiplexing reference signals in a subframe or slot with OFDM symbols that utilize different numerologies according to at least one example of the present disclosure.

Turning to FIG. 6, a block diagram is shown illustrating multiplexing reference signals in a subframe or slot with OFDM symbols that utilize different numerologies according to at least one example of the present disclosure. In the depicted example, resource elements 0-15 of the symbol 602 are shown employing a first numerology, and resource elements 0-7 of the half-symbol 604 are shown employing a second numerology that is scaled from the first numerology by an integer 'k' equal to 2, as described above. FIG. 6 also shows the symbols as they can be aligned, as described above with reference to FIG. 4. As shown, each of the shaded resource elements of the symbol 602 have a center of the subcarrier that is aligned with a respective resource element of the half symbol 604.

In this example, resource element 0 of the symbol 602 and resource element 0 of the half symbol 604, which are centered together, can both be employed to multiplex two reference signals for two antenna ports, where an antenna port is used as a generic term for signal transmission under identical channel conditions. An antenna port could refer to some physical antenna, but in general refers to logical antennas whose mapping to physical transmit antennas is up to the transmitter's choice. In this example, the wireless communication device 500 can transmit the multiplexed reference signals in the resource element 0 of the symbol 602 and the resource element 0 of the half symbol 604 using an orthogonal cover code (OCC) to multiplex the two reference signals for the two antenna ports, even though they employ different subcarrier spacing. Similarly, reference signals can be multiplexed for transmission in resource element 2 of the symbol 602 and resource element 1 of the half symbol 604. Similar multiplexing can also be employed for transmissions across resource element 4 of the symbol 602 and resource element 2 of the half symbol 604, resource element 6 of the symbol 602 and resource element 3 of the half symbol 604, and so on with each of the even-numbered resource elements of the symbol 602 and each of the resource elements of the half symbol 604.

As stated, an orthogonal cover code (OCC) can be used to multiplex the two reference signals for two antenna ports in the example depicted in FIG. 6. One example of an orthogonal cover code that may be used to multiplex reference signals on resource element 0 of the symbol 602 and resource element 0 of the half symbol 604, a reference signal value for antenna port 1 'P1' (e.g., for a first antenna) and antenna port 2 'P2' (e.g., for a second antenna) can be added together to calculate a multiplexed value for transmission as signal 0 of the symbol 602. For calculating a multiplexed value to be transmitted in the resource element 0 of the half symbol 604, the reference signal value for antenna port 2 'P2' can be subtracted from the reference signal value for antenna port 1 P1'. In other words, the resource element 0 of the symbol 602 can transmit the value resulting from P1+P2, and the resource element 0 of the half symbol 604 can transmit the value resulting from P1−P2. The receiving wireless communication device can then calculate the values for the respective reference signals for antenna ports 1 and 2 from the two values received in resource element 0 of symbol 602 and resource element 0 of half symbol 604. Similar reference signal multiplexing can be employed for transmissions in resource elements '2' of symbol 602 and '1' of half symbol 604, resource elements '4' of symbol 602 and '2' of half symbol 604, resource elements '6' of symbol 602 and '3' of half symbol 604, etc.

The odd-numbered resource elements of the symbol 602 can be utilized to carry other signals, such as data signals, other reference signals, etc. For example, resource elements 1, 3, 5, 7, 9, 11, 13, and 15 of the symbol 602 may be utilized to carry data signals in one or more implementations.

In another implementation, the shaded resource elements in FIG. 6 may be utilized to transmit reference signals for a plurality of antenna ports, and the unshaded resource elements of the symbol 602 (e.g., resource elements 1, 3, 5, 7, 9, 11, 13, and 15) may be utilized to transmit reference signals for one or more different antenna ports. For example, the shaded resource elements in the symbol 602 and the half symbol 604 can be utilized to transmit multiplexed pilots for antenna ports 1 and 2 that may experience channels with a relatively larger delay spread. In the depicted example, this will result in 16 measurements for antenna ports 1 and 2 over the depicted span of bandwidth. The unshaded resource elements of the symbol 602 can transmit pilots for antenna ports 3 and 4 using code division multiplexing. In this example, the antenna ports 3 and 4 can represent antenna ports that experience channels with a relatively smaller delay spread. In the depicted example, this will result in eight measurements for antenna ports 3 and 4 over the same depicted span of bandwidth. In such an example, a wireless communication device 500 implemented as a scheduling entity may inform the scheduled entity which signals carry which layers based on the experienced delay spread. Alternatively, a scheduled entity may inform the scheduling entity regarding the delay spread of the layers, and may request that reference signals for antenna ports that are relatively easier to estimate are transmitted on the unshaded resource elements of the symbol 602, while the reference signals for antenna ports that are relatively harder to estimate are transmitted on the shaded resource elements of the symbol 602 and the half symbol 604 with the multiplexing described above.

Figure 7:
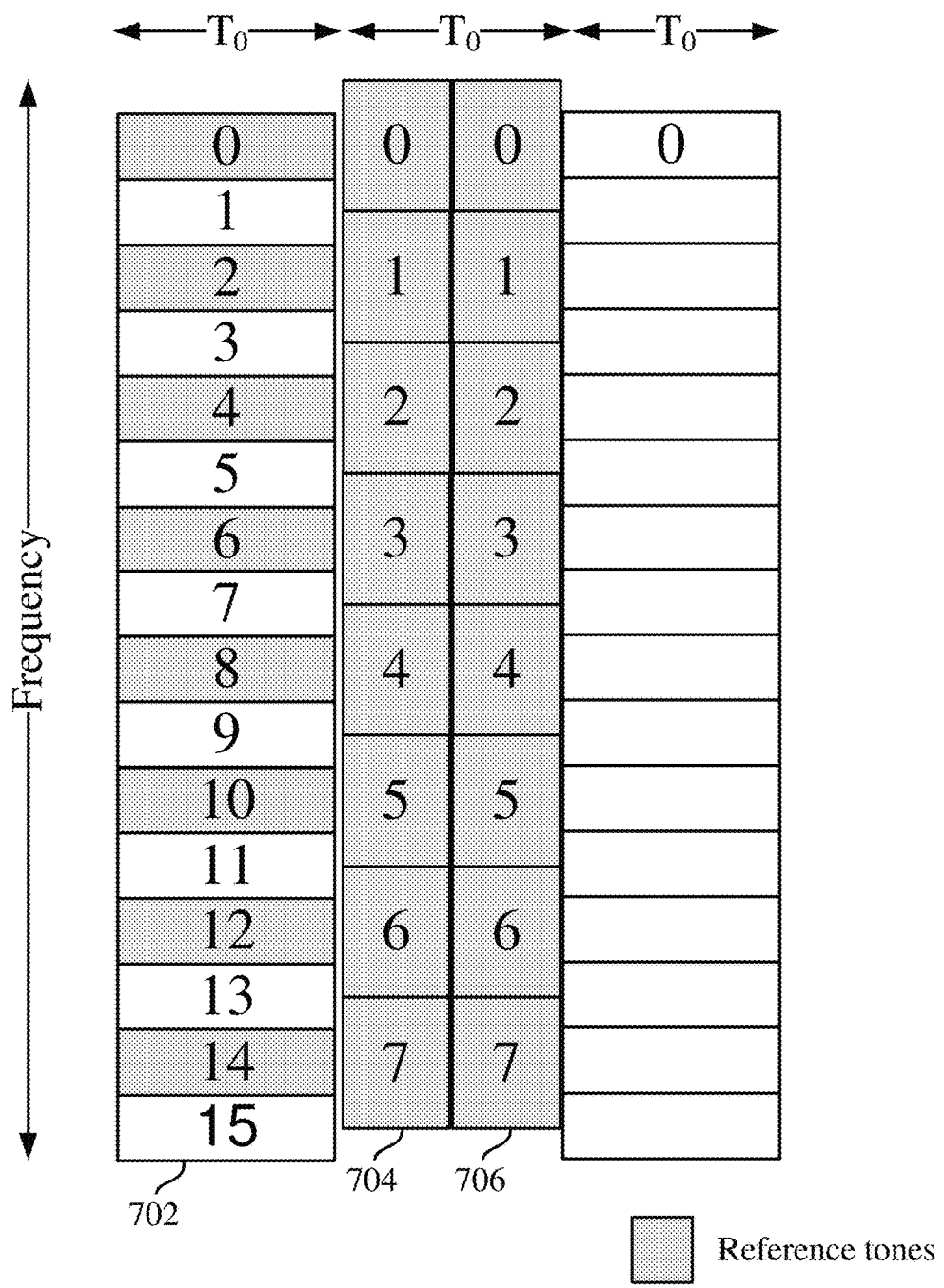
FIG. 7 is a block diagram illustrating multiplexing reference signals in a subframe or slot with OFDM symbols that utilize different numerologies according to at least one example of the present disclosure.

Turning now to FIG. 7, a block diagram is shown illustrating multiplexing reference signals in a subframe or slot with OFDM symbols that utilize different numerologies according to at least one example of the present disclosure. In the depicted example, resource elements 0-15 of the symbol 702 are shown employing a first numerology, and resource elements 0-7 of the first half symbol 704 and 0-7 of the second half symbol 706 are shown employing a second numerology that is scaled from the first numerology by an integer 'k' equal to 2, as described above. FIG. 7 also shows the symbols as they can be aligned, as described above with reference to FIG. 4. As shown, each of the shaded resource elements of the symbol 702 have a subcarrier center that is aligned with a respective subcarrier center of the resource elements of the first half symbol 704 and the second half symbol 706.

Figure 8:
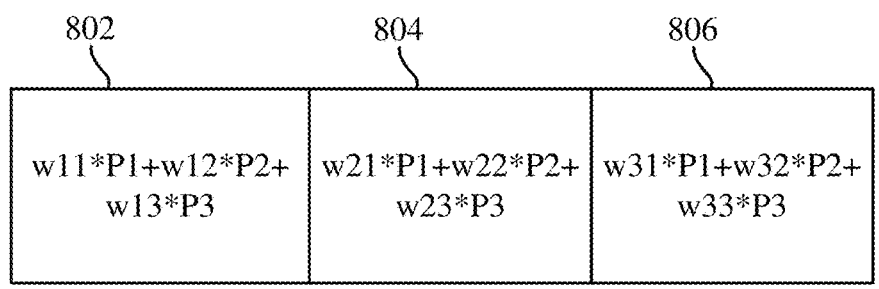
FIG. 8 is a block diagram illustrating application of multiplexing across three resource elements for multiplexing the three resource elements using a 3-DFT spread.

In the example in FIG. 7, reference signals are multiplexed across three different resource elements. For instance, reference signals can be multiplexed and transmitted on resource element 0 in the symbol 702, resource element 0 in the first half symbol 704, and resource element 0 in the second half symbol 706. This similar pattern can continue for all of the shaded resource elements in FIG. 7. In this manner, three antenna ports can be multiplexed. In at least one example, the three reference signals can be multiplexed across the three resource elements using a 3-DFT (discrete Fourier transform). For instance, FIG. 8 shows an example of equations that may be utilized for multiplexing reference signals for three different antenna ports across a first resource element 802, a second resource element 804 and a third resource element 806 using a 3-DFT spread. In this example, each 'w' value represents a known weight that is multiplied with the antenna port value P1, P2, or P3. As P1, P2, and P3 are unknowns to the receiving device, the receiving device can calculate P1, P2, and P3 from the three different values received in the three resource elements.

Figure 9:
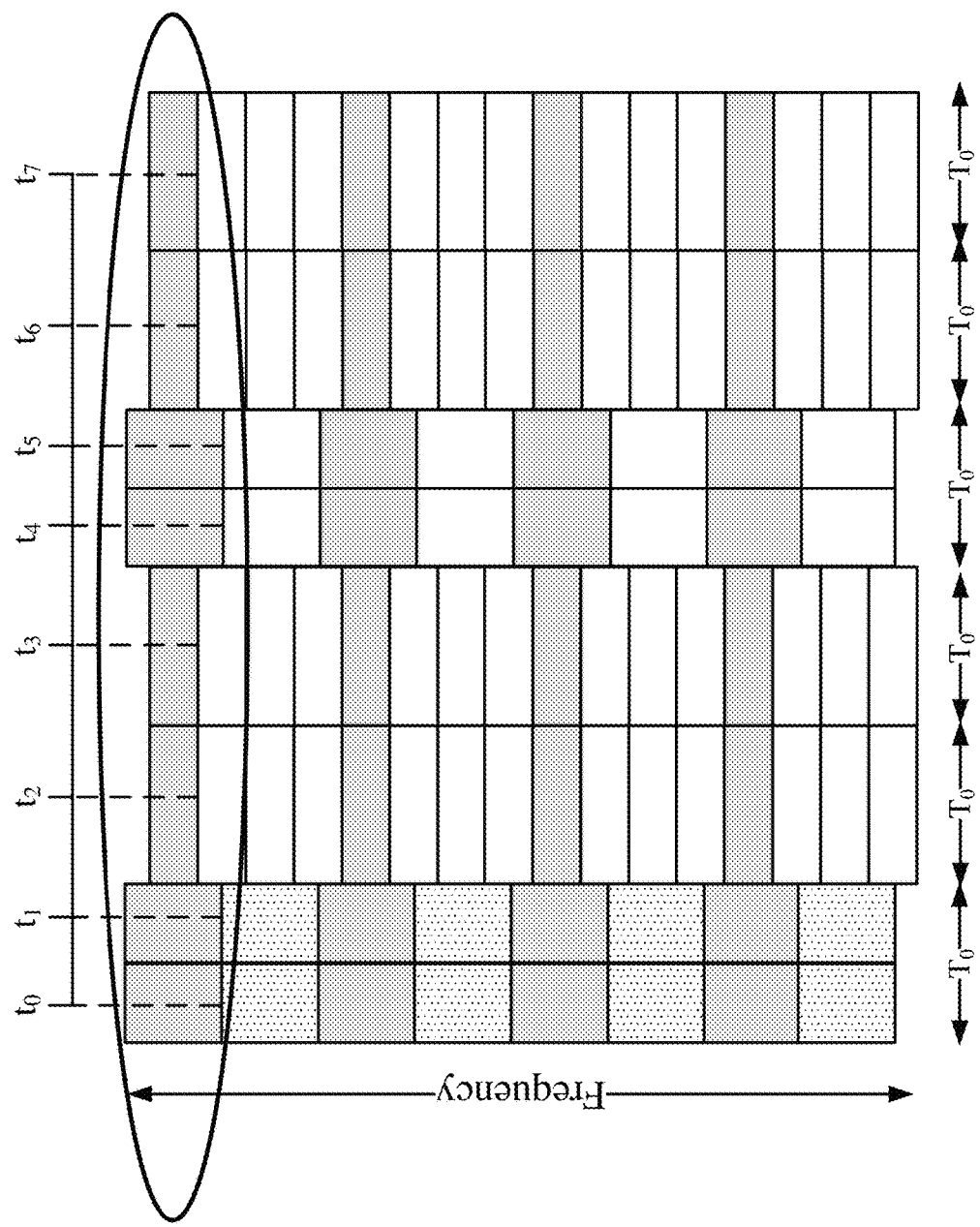
FIG. 9 is a block diagram illustrating resource elements being multiplexed according to at least one implementation.

Although the example in FIG. 7 shows three resource elements being multiplexed, it should be understood that the number of resource elements may also be greater than three. That is, additional whole symbols or fractionated symbols can also be multiplexed in a manner similar to that described herein. Additionally, the time domain in the example in FIG. 3 is not equally spaced for the three resource elements. FIG. 9 illustrates this difference in the time domain spacing. FIG. 9 is a block diagram with eight resource elements being multiplexed. In this example, as well as in the example depicted in FIG. 7, several resource elements utilized to carry the multiplexed reference signals have different durations. For instance, the time between $T_0$ and $T_1$ in FIG. 9 is shorter than the time between $T_1$ and $T_2$. Accordingly, the multiplexing of the reference signals across the multiple resource elements can be improved by adjusting the weights based on the phase shift of the center of each resource element, instead of using the weights of the DFT matrix in FIG. 8. For instance, reference signals in each of the circled eight resource elements can be multiplexed using weights that are dependent on the time stamp 't$_i$' (in seconds) where the center of each resource element appears after removing the cyclic prefix. Similar weights can be applied in the other shaded rows in FIG. 9. In examples where the symbols all have the same duration, the time stamps 't$_i$' are uniformly spaced and cyclic-shift weights can be based on the DFT matrix referred to above. This aspect can facilitate multiplexing antenna ports on a Doppler domain across symbols of different duration across a plurality of consecutive subframes or slots.

Referring back to FIG. 7, the unshaded resource elements in the symbol 702 can be used to transmit other signals, such as reference signals for a fourth antenna port, or even more antenna ports.

Figure 10:
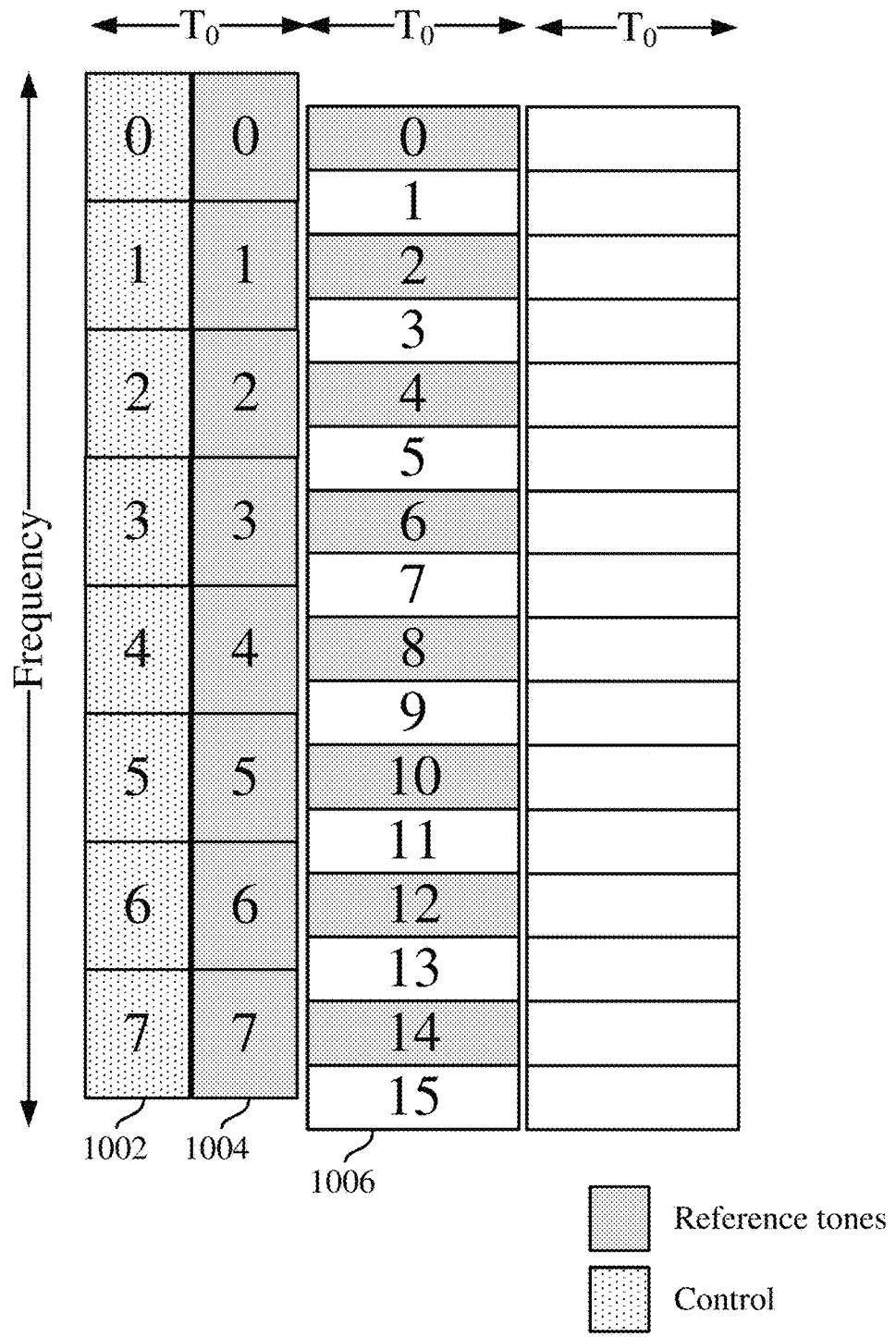
FIG. 10 is a block diagram illustrating multiplexing reference signals in a subframe or slot with OFDM symbols that utilize different numerologies according to at least one example of the present disclosure.

Referring now to FIG. 10, a block diagram is shown illustrating multiplexing reference signals in a subframe or slot with OFDM symbols that utilize different numerologies according to at least one example of the present disclosure. In this example, the scaled symbols are positioned before the base symbol. That is, resource elements 0-7 of the first half symbol 1002 and resource elements 0-7 of the second half symbol 1004 are positioned first in time, before the resource elements 0-15 of the symbol 1006. Once again, resource elements 0-7 of the first half symbol 1002 and resource elements 0-7 of the second half symbol 1004 are shown employing a numerology that is scaled from the numerology associated with the symbol 1006 by an integer 'k' equal to 2, as described above. FIG. 10 also shows the symbols as they can be aligned, as described above with reference to FIG. 4. As shown, each of the shaded resource elements of the first and second half symbols 1002, 1004 have a subcarrier center that is aligned with a respective subcarrier center of the resource elements of the symbol 1006.

In this example, the first half symbol 1002 may be utilized to transmit control information. The second half symbol 1004 may be utilized for sending additional control information or, in one or more implementations, may be utilized to transmit reference signals, as depicted. In such examples where the second half symbol 1004 is utilized for transmitting reference signals, the resource elements 0-7 associated with the second half symbol 1004 can be multiplexed with the aligned resource elements of the symbol 1006 as described above with reference to FIG. 6.

In this example, when a half symbol is sufficient for control information, providing the second half symbol 1004 for reference signals can facilitate additional opportunities for a receiver to learn the channel compared to just using a full symbol for control and a full symbol for pilots. Additionally, the reference signals in the second half-symbol 1004 can provide the ability to send pilots for two antenna ports in a shorter period of time. In this example, pilots associated with two antenna ports can be sent in the second half symbol 1004 and in the symbol 1006, facilitating the reception of reference signals for the two antenna ports in just one symbol and a half as compared to two full symbols. Accordingly, the depicted example facilitates reception of more reference signals with reduced latency. In the depicted example, the last full symbol can now be used to send data signals, where an example utilizing a full symbol for the control and two full symbols for reference signals would not be able to send data signals until after the last depicted symbol in FIG. 10. In other words, the example in FIG. 10 can be beneficial to open up bandwidth when, for instance, a half symbol is sufficient for transmitting control information, as well as beneficial for reducing latency. These are just some benefits, and those of ordinary skill in the art can identify other benefits that can be accomplished by using such aspects of the present disclosure.

In the example in FIG. 10, the odd-numbered resource elements in the symbol 1006 (e.g., resource elements 1, 3, 5, 7, 9, 11, 13, and 15) can send other signals, including other reference signals as described above. In some implementations, the shaded and unshaded resource elements in the symbol 1006 may be utilized to send different types of reference signals. In at least one example, the unshaded resource elements in symbol 1006 may be utilized to send reference signals associated with channel state information, which may be referred to by those of skill in the art as channel state information reference signals (CSI-RS). The shaded resource elements in the second half symbol 1004 and the symbol 1006 can be utilized to send multiplexed reference signals associated with demodulation reference signals, which may be referred to by those of skill in the art as DMRS reference signals.

Figure 11:
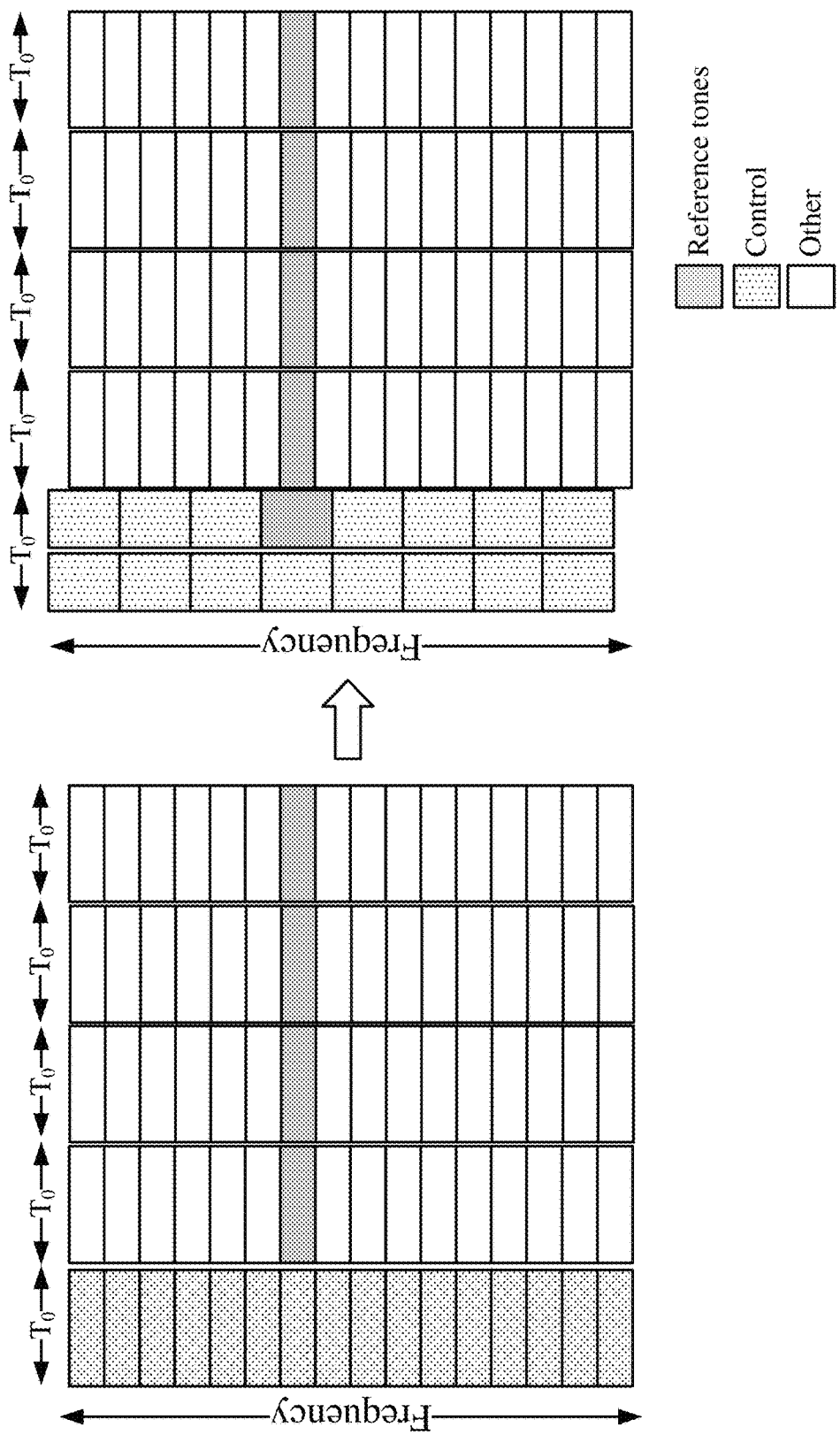
FIG. 11 is a block diagram illustrating implementation of aspects of the present disclosure according to one example.

FIG. 11 is a block diagram illustrating implementation of aspects of the present disclosure according to one example. On the left is shown an example of a transmission example using the same numerology for all symbols. In frequencies referred to as millimeter wave, there may be phase compensation pilots transmitted in a subcarrier for each symbol. In the depicted example, such phase compensation pilots are shown by the shaded resource elements within the $2^{nd}$, $3^{rd}$, $4^{th}$, and $5^{th}$ symbols in FIG. 11. In the depicted example, the $1^{st}$ symbols are utilized for control information, as depicted by the pattern-filled resource elements.

Implementing aspects of the present disclosure, the first symbol can be scaled by an integer, as described above with reference to FIG. 4. In the example depicted on the right side in FIG. 11, the $1^{st}$ symbol employs a scaled numerology by an integer 'k' equal to 2, as described above. In this example, the $1^{st}$ symbol, now including two half symbols, can still transmit control information, except for a single resource element depicted by the shaded half symbol is shown being utilized to carry a reference signal. As a result, the control resources are decreased by a relatively small amount (e.g., a single resource element), while facilitating transmission of a reference signal earlier than was possible in the example on the left in FIG. 11.

Figure 12:
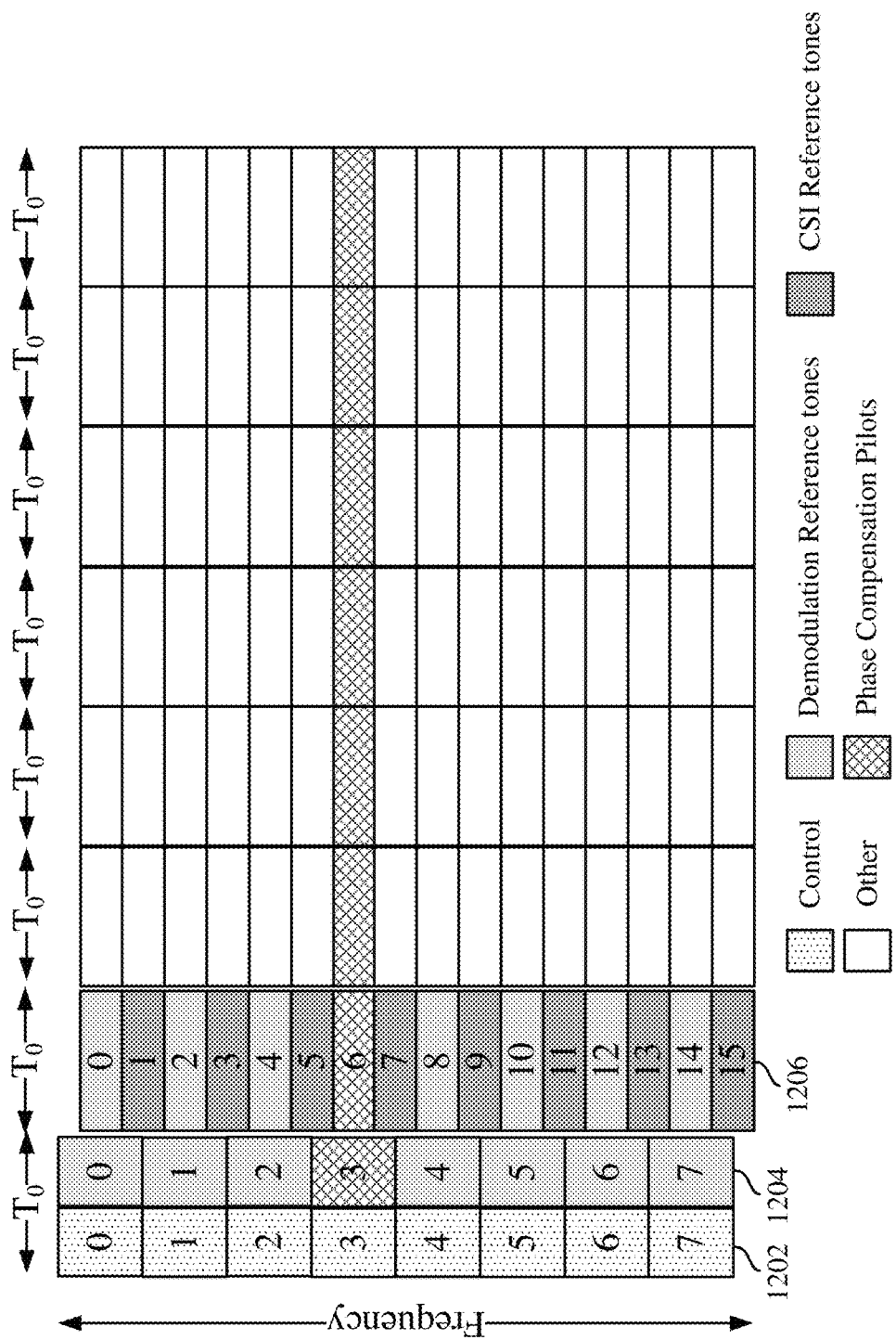
FIG. 12 is a block diagram illustrating utilization of different reference signals according to at least one example.

According to aspects of the present disclosure, various types of reference signals may be included in the transmissions. As noted above, one or more reference signals in the various examples may be demodulation reference signals and/or CSI reference signals. Additionally, other types of reference signals may be transmitted in various implementations of the present disclosure. For instance, phase compensation pilots can also be included, as shown in the block diagram depicted in FIG. 12. As shown, a first half symbol 1202 can be utilized to send control information, the second half symbol 1204 can be utilized to send demodulation reference signals, the symbol 1206 can be used to send a combination of demodulation reference signals and channel state information (CSI) reference signals. Additionally, phase compensation pilots are multiplexed in resource element 3 in the second half symbol 1204, resource element 6 in the symbol 1206, and the subsequent aligned resource elements in the following symbols, as shown in the depicted example.

Figure 13:
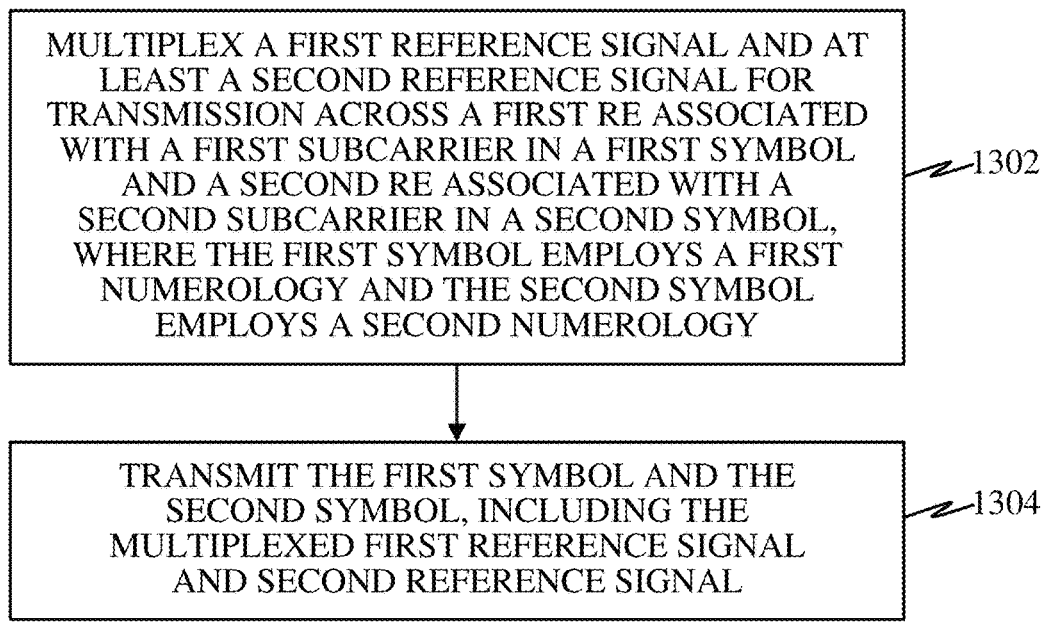
FIG. 13 is a flow diagram illustrating an example of a method operational on a wireless communication device according to at least one implementation of the present disclosure.

FIG. 13 is a flow diagram illustrating an example of a method operational on a wireless communication device, such as the wireless communication device 500, according to at least one implementation of the present disclosure. In the implementation depicted, a wireless communication device 500 may multiplex a first reference signal and at least a second reference signal for transmission across a first resource element and a second resource element at 1302. As set forth previously herein with reference to FIGS. 4, 6, 7, and 9-12, the first resource element can utilize a first subcarrier in a first OFDM symbol employing a first numerology. Further, the second resource element can utilize a second subcarrier in a second OFDM symbol employing a second numerology that is different from the first numerology, where the second subcarrier overlaps at least a portion of the first subcarrier. In one or more implementations, the first subcarrier can be centered at the same frequency as the center for the second subcarrier. In at least one example, the processing circuit 506 may include logic (e.g., multiplexing circuit/module 518, multiplexing operations 520) to multiplex the first reference signal and at least a second reference signal utilizing code division multiplexing for transmission across the first resource element and the second resource element, as described herein.

Figure 14:
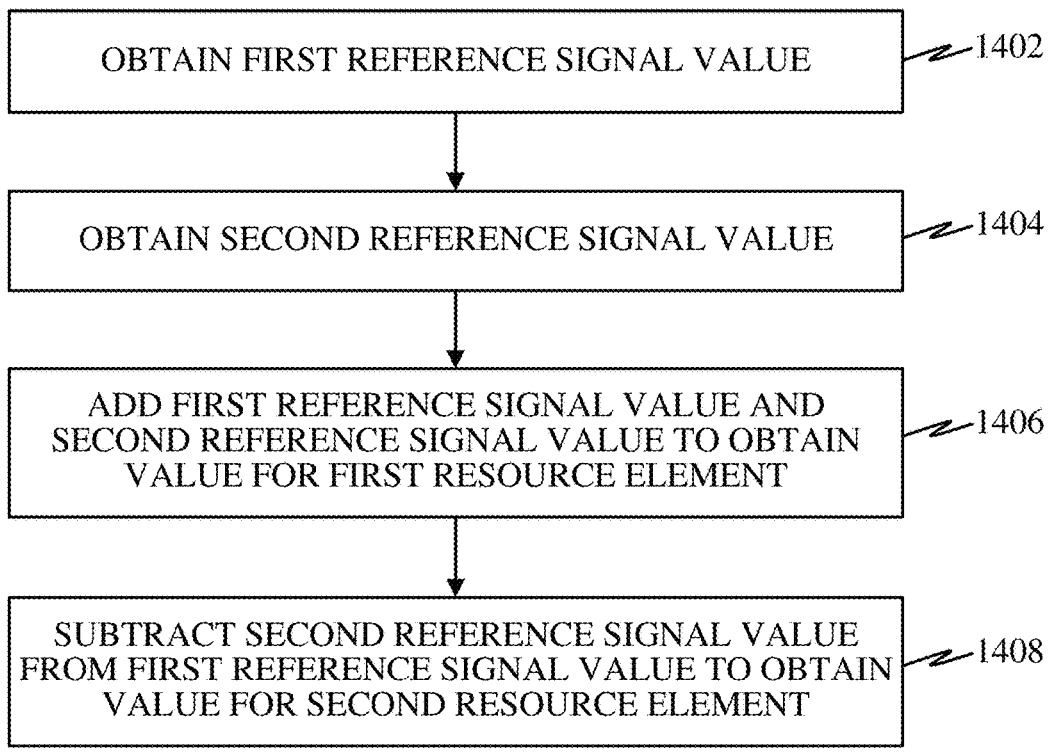
FIG. 14 is a flow diagram depicting at least one implementation for multiplexing the first and second reference signals utilizing an orthogonal cover code.

In one or more examples, the processing circuit 506 may include logic (e.g., multiplexing circuit/module 518, multiplexing operations 520) to multiplex the first reference signal and the second reference signal utilizing an orthogonal cover code. FIG. 14 is a flow diagram depicting at least one implementation for multiplexing the first and second reference signals utilizing an orthogonal cover code. As shown, a first reference signal value may be obtained at 1402. Further, a second reference signal value may be obtained at 1404. The first reference signal value may relate to a reference signal value for a first antenna port P1, and the second reference signal value may relate to a reference signal value for a second antenna port P2.

At 1406, the first reference signal value may be added to the second reference signal value to obtain a value for the first resource element. For example, as depicted in FIG. 6, the value for the resource element 0 of the symbol 602 can be calculated from P1+P2.

At 1408, the second reference signal value may be subtracted from the first reference signal value to obtain a value for the second resource element. For example, as depicted in FIG. 6, the value for the resource element 0 of the half symbol 604 can be calculated from P1−P2.

Figure 15:
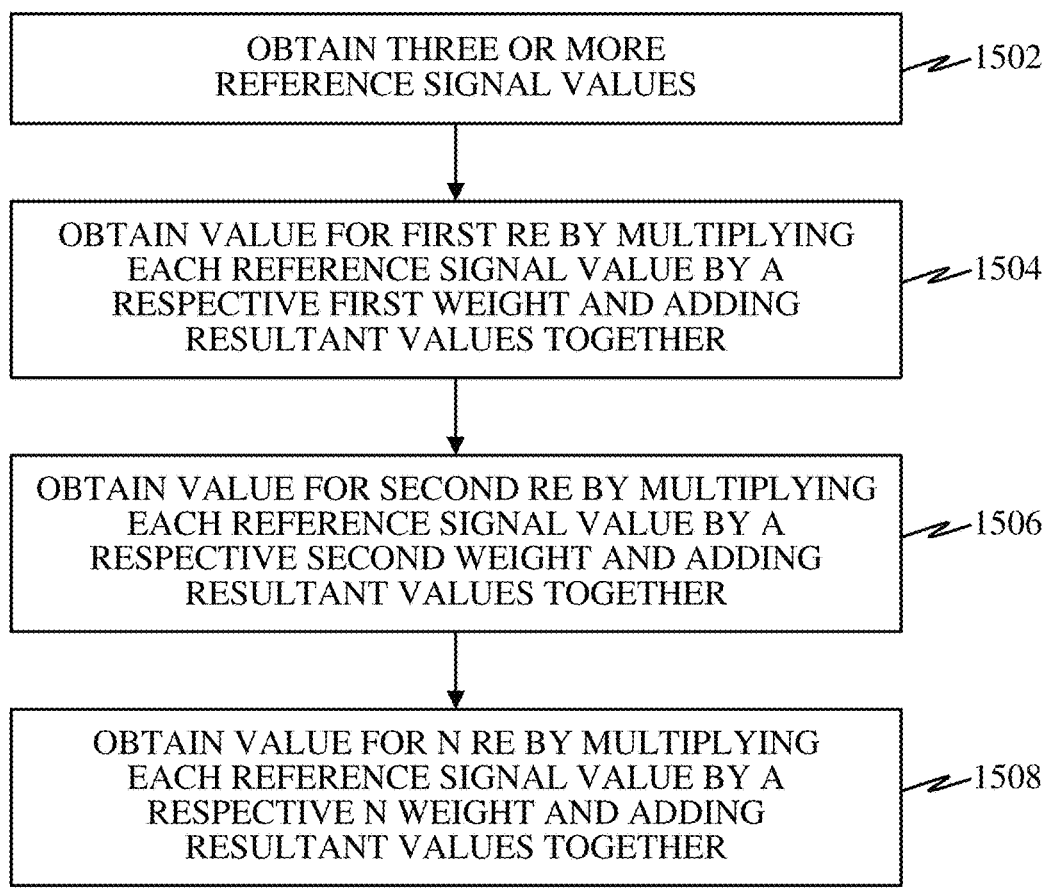
FIG. 15 is a flow diagram depicting at least one implementation for multiplexing the first and second reference signals utilizing a discrete Fourier transform (DFT).

In one or more further examples, the processing circuit 506 may include logic (e.g., multiplexing circuit/module 518, multiplexing operations 520) to multiplex the first reference signal and the second reference signal utilizing a discrete Fourier transform (DFT). FIG. 15 is a flow diagram depicting at least one implementation for multiplexing the first and second reference signals utilizing a DFT. As shown, three or more reference signal values may be obtained for multiplexing across the plurality of resource elements at 1502. The plurality of reference signal values may relate to reference signal values for respective antenna ports P1, P2, . . . PN.

At 1504, a value for the first resource element may be obtained by multiplying each reference signal value by a respective first weight, and adding the resultant values together. For instance, in the example depicted in FIG. 8 with three reference signals multiplexed across three resource elements, a value for the first resource element 802 is calculated by the equation (w11*P1)+(w12*P2)+(w13*P3), where each respective weight corresponds to the value in the DFT matrix below the example resource elements 802, 804, and 806 in FIG. 8. As noted herein, the respective weights utilized in the example equations may be determined based at least in part on the duration of the OFDM symbols. For example, the respective weights utilized may be determined based at least in part on the time stamp 't$_i$' where the center of each resource element appears after removing the cyclic prefix.

At 1506, a value for the second resource element may be obtained by multiplying each reference signal value by a respective second weight, and adding the resultant values together. For instance, in the example depicted in FIG. 8, a value for the second resource element 804 is calculated by the equation (w21*P1)+(w22*P2)+(w23*P3), where each respective weight corresponds to the value in the DFT matrix in the example. Again, the respective weights utilized in the example equations may be determined based at least in part on the duration of the OFDM symbols.

At 1508, a value for the N resource element may be obtained by multiplying each reference signal value by a respective N weight, and adding the resultant values together. For instance, in the example depicted in FIG. 8, a value for the third resource element 806 is calculated by the equation (w31*P1)+(w32*P2)+(w33*P3), where each respective weight corresponds to the value in the DFT matrix in the example. Again, the respective weights utilized in the example equations may be determined based at least in part on the duration of the OFDM symbols.

In some implementations, the second numerology may be scaled from the first numerology. In other implementations, the first numerology may be scaled from the second numerology.

In at least some implementations, the first reference signal can be associated with a first antenna port and the second reference signal can be associated with a second antenna port, as described herein. Furthermore, one or more implementations may include selecting a code division multiplexing weight based at least in part on the duration of the first OFDM symbol and the duration of the second OFDM symbol, as also described herein.

At 1304, the wireless communication device 500 can transmit the first OFDM symbol and the second OFDM symbol including the multiplexed first reference signal and second reference signal. For example, the processing circuit 506 may include logic (e.g., multiplexing circuit/module 518, multiplexing operations 520) to transmit the first OFDM symbol and the second OFDM symbol via the transceiver 514, with the multiplexed first reference signal and second reference signal.

In one or more implementations, the wireless communication device 500 may further transmit one of a third reference signal, a data symbol, or control information in a third resource element associated with the first OFDM symbol. In implementations where control information is transmitted in the third resource element associated with the first OFDM symbol, the control information can be transmitted prior to the multiplexed first reference signal and second reference signal as described above with reference to FIGS. 10-12.

Several aspects of a wireless communication network have been presented with reference to one or more exemplary implementations. As those skilled in the art will readily appreciate, various aspects described throughout this disclosure may be extended to other telecommunication systems, network architectures and communication standards. By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

One or more of the components, steps, features and/or functions illustrated in FIGS. 1, 2, 3, 4, 5, 6, 7, 8, 9, 10, 11, 12, 13, 14, and/or 15 may be rearranged and/or combined into a single component, step, feature or function or embodied in several components, steps, or functions. Additional elements, components, steps, and/or functions may also be added or not utilized without departing from novel features disclosed herein. The apparatus, devices, and/or components illustrated in FIGS. 1, 2, and/or 5 may be configured to perform and/or utilize one or more of the methods, features, parameters, and/or steps described herein. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
  a transceiver;
  a memory; and
  a processor communicatively coupled to the transceiver and the memory, the processor adapted to:
    multiplex a first reference signal and at least a second reference signal utilizing code division multiplexing for transmission across a first resource element and a second resource element, wherein
      the first resource element utilizes a first subcarrier in a first orthogonal frequency division multiplexed (OFDM) symbol employing a first numerology, and
      the second resource element utilizes a second subcarrier in a second OFDM symbol employing a second numerology that is different from the first numerology, wherein the second subcarrier overlaps in frequency at least a portion of the first subcarrier; and
    transmit the first OFDM symbol and the second OFDM symbol via the transceiver, the transmission including the multiplexed first reference signal and second reference signal.

2. The wireless communication device of claim 1, wherein the first reference signal is multiplexed with at least the second reference signal utilizing an orthogonal cover code.

3. The wireless communication device of claim 1, wherein the first reference signal is multiplexed with at least the second reference signal utilizing a discrete Fourier transform.

4. The wireless communication device of claim 3, wherein a respective weight employed for multiplexing the first reference signal and the second reference signal is dependent on a duration of the first OFDM symbol and a duration of the second OFDM symbol.

5. The wireless communication device of claim 1, wherein the first reference signal is associated with a first antenna port and the second reference signal is associated with a second antenna port.

6. The wireless communication device of claim 1, wherein the processor is further adapted to:
  transmit via the transceiver one of a data symbol or a third reference signal on a third resource element in the first OFDM symbol.

7. The wireless communication device of claim 1, wherein the first subcarrier is centered at a same frequency as a center of the second subcarrier, and wherein the first OFDM symbol and the second OFDM symbol employ different symbol durations.

8. The wireless communication device of claim 1, wherein the second numerology is scaled from the first numerology, or the first numerology is scaled from the second numerology.

9. The wireless communication device of claim 1, wherein the first numerology is scaled from the second numerology, and the processor is further adapted to:
  transmit control information via the transceiver in a third resource element in the first OFDM symbol, wherein the control information is transmitted prior to the multiplexed first reference signal and second reference signal on the first subcarrier as the first resource element.

10. A method operational on a wireless communication device, comprising:
  multiplexing a first reference signal and at least a second reference signal utilizing code division multiplexing for transmission across a first resource element and a second resource element, wherein
    the first resource element utilizes a first subcarrier in a first orthogonal frequency division multiplexed (OFDM) symbol employing a first numerology, and
    the second resource element utilizes a second subcarrier in a second OFDM symbol employing a second numerology that is different from the first numerology, wherein the second subcarrier overlaps in frequency at least a portion of the first subcarrier; and
  transmitting the first OFDM symbol and the second OFDM symbol, the transmission including the multiplexed first reference signal and second reference signal.

11. The method of claim 10, wherein multiplexing the first reference signal and at least the second reference signal utilizing code division multiplexing comprises:
  multiplexing the first reference signal and at least the second reference signal utilizing an orthogonal cover code.

12. The method of claim 10, wherein multiplexing the first reference signal and at least the second reference signal utilizing code division multiplexing comprises:
  multiplexing the first reference signal and at least the second reference signal utilizing a discrete Fourier transform.

13. The method of claim 12, wherein multiplexing the first reference signal and at least the second reference signal utilizing a discrete Fourier transform comprises:
  determining a respective code division multiplexing weight employed for multiplexing the first reference signal and the second reference signal utilizing the discrete Fourier transform based at least in part on a duration of the first OFDM symbol and a duration of the second OFDM symbol.

14. The method of claim 10, wherein the first reference signal is associated with a first antenna port and the second reference signal is associated with a second antenna port.

15. The method of claim 10, wherein a frequency center for the first subcarrier is substantially the same as a frequency center for the second subcarrier.

16. The method of claim 10, further comprising:
  transmitting on a third resource element in the first OFDM symbol one of a data symbol, a third reference signal, or control information.

17. The method of claim 10, wherein at least one of the first reference signal or the second reference signal comprises a reference signal selected from a group of reference signals comprising a demodulation reference signal, a CSI reference signal, and a phase compensation pilot.

18. A wireless communication device, comprising:
  means for multiplexing a first reference signal and at least a second reference signal utilizing code division multiplexing for transmission across a first resource element and a second resource element, wherein
    the first resource element utilizes a first subcarrier in a first orthogonal frequency division multiplexed (OFDM) symbol employing a first numerology, and
    the second resource element utilizes a second subcarrier in a second OFDM symbol employing a second numerology that is different from the first numerology, wherein the second subcarrier overlaps in frequency at least a portion of the first subcarrier; and
  means for transmitting the first OFDM symbol and the second OFDM symbol, the transmission including the multiplexed first reference signal and second reference signal.

19. The wireless communication device of claim 18, wherein multiplexing the first reference signal and at least the second reference signal utilizing code division multiplexing comprises:
  multiplexing the first reference signal and at least the second reference signal utilizing an orthogonal cover code.

20. The wireless communication device of claim 18, wherein multiplexing the first reference signal and at least the second reference signal utilizing code division multiplexing comprises:
  multiplexing the first reference signal and at least the second reference signal utilizing a discrete Fourier transform.

21. The wireless communication device of claim 20, wherein a respective code division multiplexing weight employed for multiplexing the first reference signal and the second reference signal utilizing the discrete Fourier transform is dependent on a duration of the first OFDM symbol and a duration of the second OFDM symbol.

22. The wireless communication device of claim 18, wherein the first reference signal is associated with a first antenna port and the second reference signal is associated with a second antenna port.

23. The wireless communication device of claim 18, wherein the first subcarrier is centered at a same frequency as a center of the second subcarrier.

24. A non-transitory processor-readable storage medium storing processor-executable programming for causing a processing circuit to:
  multiplex a first reference signal and at least a second reference signal utilizing code division multiplexing for transmission across a first resource element and a second resource element, wherein
    the first resource element is associated with a first orthogonal frequency division multiplexed (OFDM) symbol employing a first numerology, and
    the second resource element is associated with a second OFDM symbol employing a second numerology that is different from the first numerology; and
  transmit the first OFDM symbol and the second OFDM symbol, the transmission including the multiplexed first reference signal and second reference signal.

25. The non-transitory processor-readable storage medium of claim 24, wherein the first reference signal is multiplexed with at least the second reference signal utilizing an orthogonal cover code.

26. The non-transitory processor-readable storage medium of claim 24, wherein the first reference signal is multiplexed with at least the second reference signal utilizing a discrete Fourier transform.

27. The non-transitory processor-readable storage medium of claim 26, wherein a respective weight employed for multiplexing the first reference signal and the second reference signal utilizing the discrete Fourier transform is dependent on a duration of the first OFDM symbol and a duration of the second OFDM symbol.

28. The non-transitory processor-readable storage medium of claim 24, wherein the first reference signal is associated with a first antenna port and the second reference signal is associated with a second antenna port.

29. The non-transitory processor-readable storage medium of claim 24, wherein a frequency center for a first subcarrier utilized by the first resource element in the first OFDM symbol is substantially the same as a frequency center for a second subcarrier utilized by the second resource element in the second OFDM symbol.

30. The non-transitory processor-readable storage medium of claim 24, further comprising processor-executable programming for causing a processing circuit to:
   transmit on a third resource element associated with the first OFDM symbol one of a data symbol, a third reference signal, or control information.

* * * * *